(12) United States Patent
Dede et al.

(10) Patent No.: US 12,242,049 B2
(45) Date of Patent: Mar. 4, 2025

(54) DYNAMIC ADJUSTMENT OF FLEXIBLE MIRROR USING PHOTOCHROMATIC MATERIAL

(71) Applicant: Toyota Motor Engineering & Manufacturing North America, Inc, Plano, TX (US)

(72) Inventors: Ercan M Dede, Ann Arbor, MI (US); Shailesh N Joshi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 632 days.

(21) Appl. No.: 17/587,013

(22) Filed: Jan. 28, 2022

(65) Prior Publication Data
US 2023/0244075 A1    Aug. 3, 2023

(51) Int. Cl.
G02B 26/08        (2006.01)
(52) U.S. Cl.
CPC .................. *G02B 26/0825* (2013.01)
(58) Field of Classification Search
CPC .................................................. G02B 26/0825
USPC ........................................................ 359/846
See application file for complete search history.

(56) References Cited

U.S. PATENT DOCUMENTS

| 8,557,140 B2 | 10/2013 | Naciri et al. |
| 9,199,575 B2 | 12/2015 | Ovenshire et al. |
| 2018/0094788 A1 | 4/2018 | Tokida et al. |
| 2018/0282147 A1* | 10/2018 | Shinkawa .............. G02B 26/10 |

FOREIGN PATENT DOCUMENTS

| CN | 104358500 | 2/2015 |
| CN | 104534381 | 9/2016 |
| CN | 207350186 | 5/2018 |

* cited by examiner

Primary Examiner — Jerry L Brooks
(74) Attorney, Agent, or Firm — Jordan IP Law, LLC

(57) ABSTRACT

A light apparatus includes an optical member, composed of an elastically deformable material, having a reflective surface to reflect light. The optical member moveable between a first state in which the reflective surface has a first structural shape, and a plurality of second states in which the reflective surface has a second structural shape different than the first structural shape. Elastically deformable position adjustment members are operable to move the optical member between the first state and the plurality of second states. The elastically deformable position adjustment members have one or more photochromatic regions that are moveable in response to exposure to UV light. Light sources are operable to selectively emit illuminating UV light in a direction that contacts the one or more photochromatic regions to thereby adjust an orientation of the optical member in a manner which changes a direction of light reflected by the optical member.

20 Claims, 10 Drawing Sheets

DYNAMIC ADJUSTMENT OF FLEXIBLE MIRROR USING PHOTOCHROMATIC MATERIAL

TECHNICAL FIELD

One or more embodiments relate generally to a vehicle, a light apparatus, and a lighting system for implementation in a vehicle, a computer implemented method of operating a vehicle, and a computer program product for operating a vehicle.

BACKGROUND

Some forward lighting devices for vehicles can change the direction light is projected by changing or adjusting the position or orientation of a mirror that reflects light from a light source to a projection lens. This can be accomplished, for example, using one or more electric motors that cause the mirror to change its orientation, thus changing a projection of the light emitted by the forward lighting device.

BRIEF SUMMARY

One or more embodiments relate to a vehicle, a light apparatus, and a lighting system for implementation in a vehicle, a computer implemented method of operating a light apparatus, and a computer program product for operating a light apparatus that are operable to enhance the operation of a vehicle.

In accordance with one or more embodiments, the light apparatus includes an elastically deformable material having photochromatic properties that is dynamically moveable in response to one or more inputs signals. The elastically deformable material comprises an organic material such as, for example, spiropyran, that is embedded into a substrate material. The spiropyran will expand and contract in response to exposure to ultraviolet light. Using an elastically deformable material obviates the need for one or more electric motors to cause movement of the projection lens, thereby resulting in significant cost savings and a reduction in overall weight of the lighting system.

In accordance with one or more embodiments, an example light apparatus, which may be operable for implementation in a vehicle, comprises one or more of the following: an optical member, composed of an elastically deformable material, having a reflective surface to reflect light, the optical member being operable for movement between a first state in which the reflective surface has a first structural shape, and a plurality of second states in which the reflective surface has a second structural shape different than the first structural shape; one or more elastically deformable position adjustment members operable to move the optical member between the first state and the plurality of second states, the one or more elastically deformable position adjustment members having one or more photochromatic regions that are moveable in response to exposure to ultraviolet (UV) light; and one or more light sources operable to selectively emit illuminating UV light in a direction that contacts the one or more photochromatic regions to thereby adjust an orientation of the optical member in a manner which changes a direction of light reflected by the optical member.

In accordance with the example light apparatus, the one or more elastically deformable position adjustment members comprises a polymer substrate and the one or more photochromatic regions comprises a photochromatic material that is embedded into the polymer substrate. The photochromatic material comprises an organic material that itself comprises spiropyran.

In accordance with the example light apparatus, the one or more light sources comprise LED light sources.

In accordance with the example light apparatus, the one or more elastically deformable position adjustment members are arranged spaced apart on a surface, such as, for example, a bottom surface, of the optical member. Such bottom surface is opposite to the reflective surface of the optical member.

In accordance with the example light apparatus, the one or more elastically deformable position adjustment members are interconnected to each other on a surface, such as, for example, a bottom surface, of the optical member.

In accordance with one or more embodiments, a lighting system, which may be operable for implementation in a vehicle, comprises one or more of the following: a light apparatus that includes an optical member, composed of an elastically deformable material, having a reflective surface to reflect light, the optical member being operable for movement between a first state in which the reflective surface has a first structural shape, and a plurality of second states in which the reflective surface has a second structural shape different than the first structural shape; one or more elastically deformable position adjustment members operable to move the optical member between the first state and the plurality of second states, the one or more elastically deformable position adjustment members having one or more photochromatic regions that are moveable in response to exposure to ultraviolet (UV) light; and one or more light sources operable to selectively emit illuminating UV light in a direction that contacts the one or more photochromatic regions to thereby adjust an orientation of the optical member in a manner which changes a direction of light reflected by the optical member; and a controller, operatively coupled to the one or more light sources, the controller including one or more processors and a non-transitory memory operatively coupled to the one or more processors comprising a set of instructions executable by the one or more processors to cause the one or more processors to: dynamically conduct an analysis of sensor data; and dynamically change, in response to the analysis of the sensor data, a direction of light reflected by the optical member by causing movement of the optical member through a selective actuation of the one or more light sources.

In accordance with the example light system, the sensor data relates to an operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

In accordance with the example light system, the set of instructions cause the one or more processors to dynamically adjust the direction of light reflected by the optical member by selectively adjusting an intensity of UV light emitted by the one or more light sources.

In accordance with one or more embodiments, an example computer implemented method of operating a light apparatus that includes an optical member, composed of an elastically deformable material, having a reflective surface to reflect light, the optical member being operable for movement between a first state in which the reflective surface has a first structural shape, and a plurality of second states in which the reflective surface has a second structural shape different than the first structural shape; one or more elastically deformable position adjustment members operable to move the optical member between the first state and the plurality of second states, the one or more elastically deformable position adjustment members having one or more photochromatic regions that are moveable in response to exposure to ultraviolet (UV) light; and one or more light sources operable to selectively emit illuminating UV light in a direction that contacts the one or more photochromatic regions to thereby adjust an orientation of the optical member in a manner which changes a direction of light reflected by the optical member, the computer implemented method comprising one or more of the following: dynamically conducting an analysis of sensor data; and dynamically changing, in response to the analysis of the sensor data, a direction of light reflected by the optical member by causing movement of the optical member through a selective actuation of the one or more light sources.

In accordance with the example computer implemented method, the sensor data relates to an operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

In accordance with the example computer implemented method, dynamically adjusting the direction of light reflected by the optical member comprises selectively adjusting an intensity of UV light emitted by the one or more light sources.

In accordance with the example computer implemented method, adjusting the direction of light reflected by the optical member comprises selectively adjusting an orientation of the one or more light sources.

In accordance with one or more embodiments, an example computer program product for operating the example light apparatus, the computer program product including at least one computer readable medium, comprising a set of instructions, which when executed by one or more processors, cause the one or more processors to: dynamically conduct an analysis of sensor data; and dynamically change, in response to the analysis of the sensor data, a direction of light reflected by the optical member by causing movement of the optical member through a selective actuation of the one or more light sources.

In accordance with one or more embodiments, a vehicle comprises one or more of the following: a light system that includes: a light apparatus having an optical member, composed of an elastically deformable material, having a reflective surface to reflect light, the optical member being operable for movement between a first state in which the reflective surface has a first structural shape, and a plurality of second states in which the reflective surface has a second structural shape different than the first structural shape; one or more elastically deformable position adjustment members operable to move the optical member between the first state and the plurality of second states, the one or more elastically deformable position adjustment members having one or more photochromatic regions that are moveable in response to exposure to ultraviolet (UV) light; and one or more light sources operable to selectively emit illuminating UV light in a direction that contacts the one or more photochromatic regions to thereby adjust an orientation of the optical member in a manner which changes a direction of light reflected by the optical member; and a controller, operatively coupled to the one or more light sources, the controller including one or more processors and a non-transitory memory operatively coupled to the one or more processors comprising a set of instructions executable by the one or more processors to cause the one or more processors to: dynamically conduct an analysis of sensor data; and dynamically change, in response to the analysis of the sensor data, a direction of light reflected by the optical member by causing movement of the optical member through a selective actuation of the one or more light sources.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
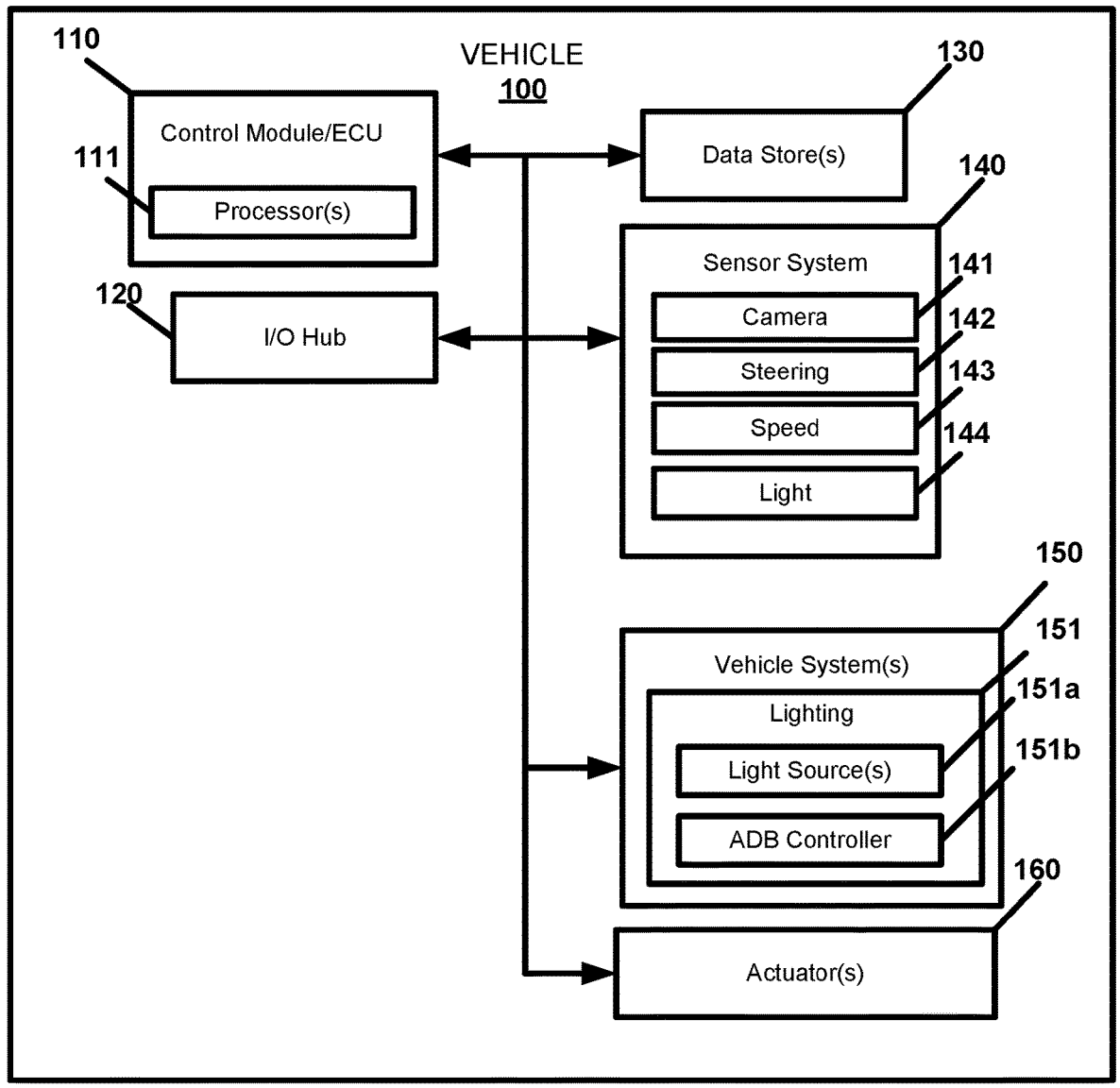
FIG. 1 illustrates an example of an example vehicle, in accordance with one or more embodiments set forth, shown, and described herein.

Turning to the figures, in which FIG. 1 illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of motorized transport.

In accordance with one or more embodiments, the vehicle 100 may comprise one or more operational elements. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments, the vehicle 100 comprises a control module/ECU 110 comprising one or more processors 111. As set forth, described, and/or illustrated herein, "processor" means any component or group of components that are operable to execute any of the processes described herein or any form of instructions to carry out such processes or cause such processes to be performed. The one or more processors may be implemented with one or more general-purpose and/or one or more special-purpose processors 111. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) operable to carry out instructions contained in program code. In embodiments in which there is a plurality of processors 111, such processors 111 may work independently from each other, or one or more processors 111 may work in combination with each other.

In accordance with one or more embodiments, the vehicle 100 may comprise an I/O hub 120 operatively connected to other systems of the vehicle 100. The I/O hub 120 may comprise an input interface, an output interface, and a network controller to facilitate communications between one or more vehicles 100. The input interface and the output interface may be integrated as a single, unitary interface, or alternatively, be separate as independent interfaces that are operatively connected.

The input interface is defined herein as any apparatus, device, component, system, element, or arrangement or groups thereof that enable information/data to be entered in a machine. The input interface may receive an input from a vehicle occupant (e.g. a driver or a passenger) or a remote operator of the vehicle 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touch screen, multi-touch screen, button, joystick, mouse, trackball, microphone and/or combinations thereof.

The output interface is defined herein as any apparatus, device, component, system, element or arrangement or groups thereof that enable information/data to be presented to a vehicle occupant and/or remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

In accordance with one or more embodiments, the vehicle 100 may comprise one or more data stores 130 for storing one or more types of data. Such data may include, but is not limited to, traffic history on the roadway, accident history on the roadway, weather history, traffic laws/guidelines based on a geographic location of the vehicle 100, etc. The vehicle 100 may include interfaces that enable one or more systems thereof to manage, retrieve, modify, add, or delete, the data stored in the one or more data stores 130. The one or more data stores 130 may comprise volatile and/or non-volatile memory. Examples of suitable one or more data stores 130 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 130 may be a component of the control module/ECU 110, or alternatively, may be operatively connected to the control module/ECU 110 for use thereby. As set forth, described, and/or illustrated herein, "operatively connected" may include direct or indirect connections, including connections without direct physical contact.

In accordance with one or more embodiments, the vehicle 100 may comprise a sensor system 140 operable, at least during operation of the vehicle 100, to dynamically detect, determine, capture, assess, monitor, measure, quantify, and/or sense information about the vehicle 100 and a driving environment external to the vehicle 100. As set forth, described, and/or illustrated herein, "sensor" means any apparatus, device, component and/or system that can perform one or more of detecting, determining, assessing, monitoring, measuring, quantifying, and sensing something. The one or more sensors of the system system 140 may be operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor system 140 may comprise for example, one or more sensors including, but not limited to ranging sensors (e.g., light detection and ranging, radio detection and ranging/radar, sound navigation and ranging/sonar), depth sensors, and image sensors (e.g., red, green, blue/RGB camera, multi-spectral infrared/IR camera). In the illustrated example of FIG. 1, the sensor system 140 comprises a camera 141, a steering sensor 142, a speed sensor 143, and a light sensor 144. The one or more sensors 141-144 may be operable to detect, determine, capture, assess, monitor, measure, quantify, and/or sense information about the operating systems of the vehicle 100 and/or an external driving environment in which the vehicle 100 is operating. In one or more example embodiments, detection of the driving environment external to the vehicle 100 may come from one or more You Only Look Once (YOLO) detectors or one or more Single Shot Detectors (SSD).

The sensor system 140 and/or the one or more sensors 141-144 may be operatively connected to the control module/ECU 110, the one or more data stores 130, and/or other elements, components, modules of the vehicle 100. The sensor system 140 and/or any of the one or more sensors 141-144 set forth, illustrated, and described herein may be provided or otherwise positioned in any suitable location with respect to the vehicle 100. For example, one or more of the sensors 141-144 may be located internally within the vehicle 100, one or more of the sensors 141-144 may be located on the exterior of the vehicle 100, one or more of the sensors 141-144 may be located to be exposed to the exterior of the vehicle 100, and/or one or more of the sensors 141-144 may be located within a component of the vehicle 100. The one or more sensors 141-144 may be provided or otherwise positioned in any suitable manner that permits practice of the one or more embodiments.

In accordance with one or more embodiments, the one or more sensors 141-144 may work independently from each other, or alternatively, may work in combination with each other. The sensors 141-144 may be used in any combination, and may be used redundantly to validate and improve the accuracy of the detection.

In accordance with one or more embodiments, the sensor system 140 may comprise one or more image devices such as, for example, one or more cameras 141. As set forth, described, and/or illustrated herein, "camera" means any apparatus, device, component, and/or system that can capture visual data. Such visual data may include one or more of video information/data and image information/data. The visual data may be in any suitable form. The one or more cameras 141 may comprise high resolution cameras. The high resolution can refer to the pixel resolution, the spatial resolution, spectral resolution, temporal resolution, and/or radiometric resolution. Alternatively or additionally, the one or more cameras 141 may comprise high dynamic range (HDR) cameras or infrared (IR) cameras. For example, one or more of the cameras 141 may be spatially oriented, positioned, operable, operable, and/or arranged to detect, determine, capture, assess, monitor, measure, quantify, and/or sense visual data from at least a portion of the external driving environment of the vehicle 100, and/or any suitable portion within the vehicle 100, and then transmit as sensor data to the control module/ECU 110 a detection value of the detected visual data.

In accordance with one or more embodiments, one or more of the cameras 141 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. One or more of the cameras may be operable with zoom in and/or zoom out capabilities.

In accordance with one or more embodiments, one or more of the cameras may be located within the vehicle 100. Alternatively or additionally, one or more of the cameras 141 may be fixed in a position that does not change relative to the vehicle 100. Alternatively or additionally, one or more of the cameras 141 may be movable so that its position can change relative to the vehicle 100 in a manner which facilitates the capture of visual data from different portions of the external driving environment of the vehicle 100. Such movement of one or more of the cameras 141 may be achieved in any suitable manner, such as, for example, by rotation (about one or more rotational axes), by pivoting (about a pivot axis), by sliding (along an axis), and/or by extending (along an axis).

In accordance with one or more embodiments, the one or more cameras 141 (and/or the movement thereof) may be controlled by one or more of the control module/ECU 110, the sensor system 140, and any one or more of the modules, systems, and subsystems set forth, described, and/or illustrated herein.

In accordance with one or more embodiments, the sensor system 140 may comprise one or more vehicle steering sensors 142 operable to dynamically detect, determine, capture, assess, monitor, measure, quantify, and/or sense information relating to the steering of the vehicle 100. For example, the one or more steering sensors 142 may be operable to detect, determine, capture, assess, monitor, measure, quantify, and/or sense a steering angle or steering torque of a steering wheel of the vehicle 100, and then transmit as sensor data to the control module/ECU 110 a detection value of the detected steering angle or detected steering torque. The one or more vehicle steering sensors 142 may work independently from each other, or alternatively, may work in combination with each other. The one or more vehicle steering sensors 142 may be used in any combination, and may be used redundantly to validate and improve the accuracy of the detection.

In accordance with one or more embodiments, the sensor system 140 may comprise one or more vehicle speed sensors 143 such as, for example, speedometers, that are operable to detect, determine, capture, assess, monitor, measure, quantify, and/or sense the speed of the vehicle 100 and other vehicles in the external driving environment, and then transmit as sensor data to the control module/ECU 110 a detection value of the detected speed of the vehicle 100 and other vehicles in the external driving environment.

In accordance with one or more embodiments, the detected speed of the vehicle 100 is based on the wheel speed of one or more of the vehicle front wheels and the rear wheels. The one or more vehicle speed sensors 143 may work independently from each other, or alternatively, may work in combination with each other. The one or more vehicle speed sensors 143 may be used in any combination, and may be used redundantly to validate and improve the accuracy of the detection.

In accordance with one or more embodiments, the sensor system 140 may comprise one or more light sensors 144 that are operable to detect, determine, capture, assess, monitor, measure, quantify, and/or sense the operable state of the lighting system 151 and/or the amount of ambient light in the external driving environment, and then transmit as sensor data to the control module/ECU 110 a detection value of the detected operable state of the lighting system 151 and/or the amount of ambient light in the external driving environment.

During operation of the vehicle 100, the processor(s) of the control module/ECU 110 may be operable to selectively activate one or more of the sensors 141-144 to sense the external driving environment based on current given environmental conditions including, but not limited to the roadway, other vehicles, adjacent lanes, traffic rules, objects on the roadway, etc.

In accordance with one or more embodiment, the vehicle 100 may comprise one or more vehicle systems 150, including but not limited to a lighting system 151 to provide illuminating to the interior vehicle cabin and/or to the external driving environment of the vehicle 100. Embodiments, however, are not limited thereto, and thus, the vehicle 100 may comprise more, fewer or different systems.

In accordance with one or more embodiments, the lighting system 151 may comprise or one or light devices or apparatus (e.g., vehicle headlamps) having an adaptive driving beam (ADB) controller 151a operable to control one or more light sources 151b. The ADB controller 151a may comprise one or more processors and one or more data stores. The ADB controller 151a may be operatively connected to the control module/ECU 110, and thus, may be in communication to send and/or receive information from the various vehicle systems 110 to control the light devices.

Figure 2A:
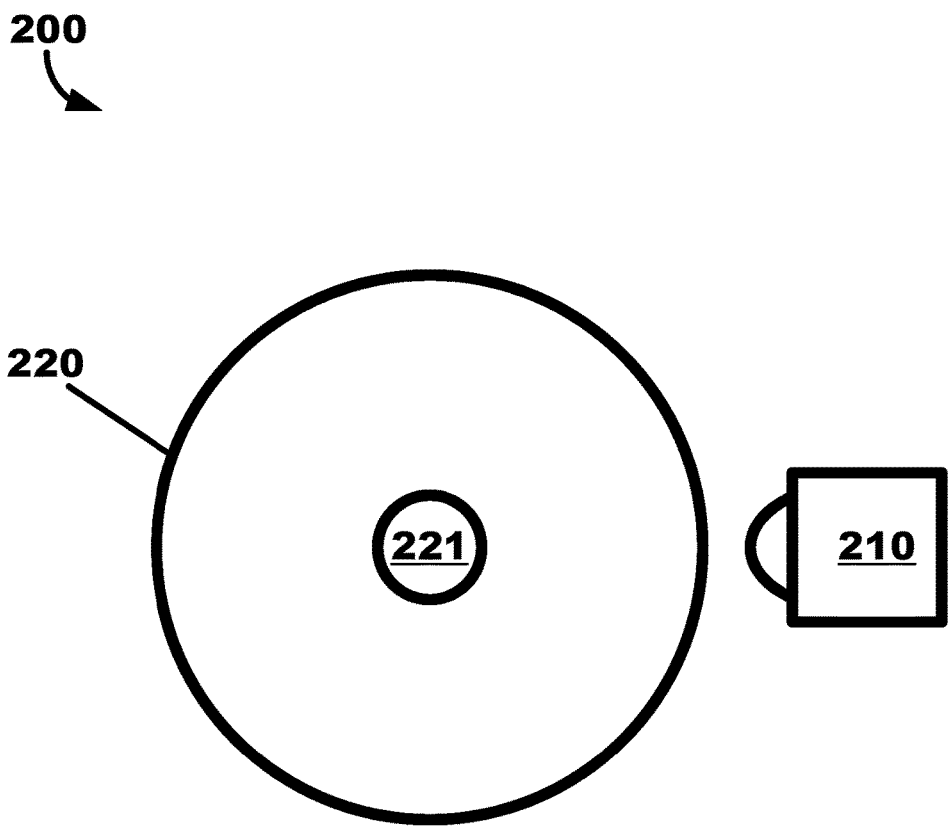
FIGS. 2A through 2C illustrate an example light apparatus and an elastically deformable position adjustment member of the example light apparatus, in accordance with one or more embodiments set forth, shown, and described herein.
Figure 2B:
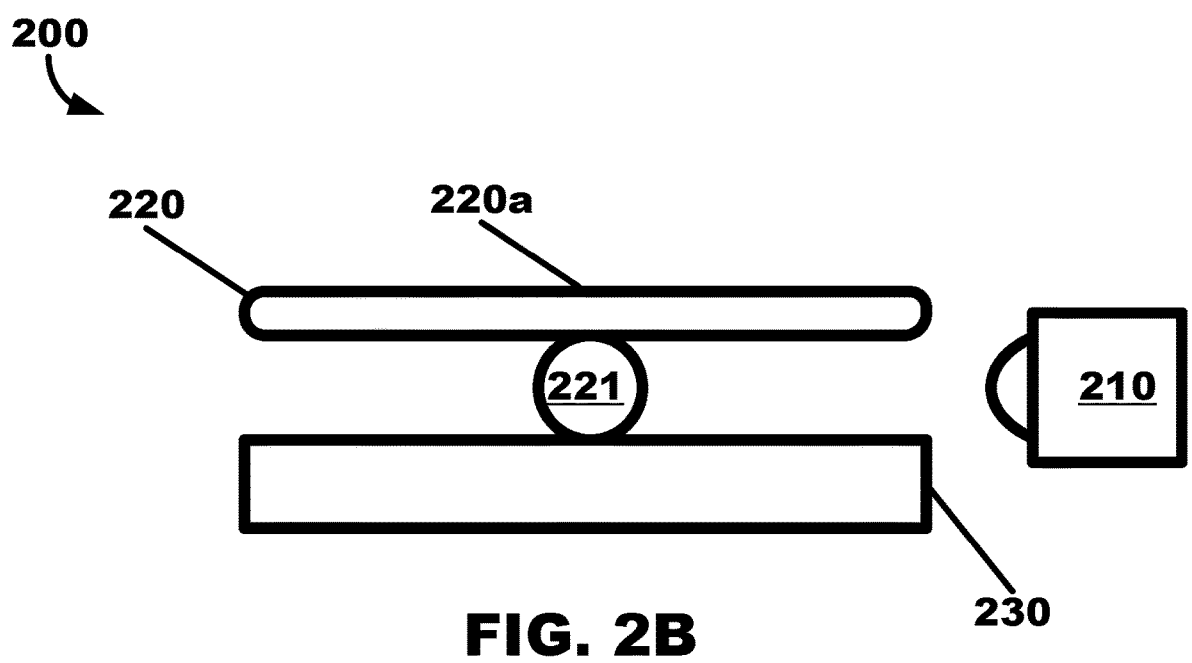

As illustrated in FIGS. 2A and 2B, an example light apparatus 200 is provided in accordance with one or more embodiments. The light apparatus 200 comprises an optical member 220 composed of an elastically deformable material. The elastically deformable material may comprise a shape memory material. The optical member 220 comprises, for example, a mirror having a reflective surface 220*a* operable to reflect light. For example, the light reflected by the optical mirror 220 may be reflected in a direction to contact another optical member such as, for example, a projection lens (not illustrated). Because of its elastically deformable material composition, the optical member 220 is operable for movement between a first state in which the reflective surface has a first structural shape, and a plurality of second states in which the reflective surface 220*a* has a second structural shape different than the first structural shape.

In accordance with one or more embodiments, the first structural shape of the reflective surface 220*a* may have a generally planar configuration whereas the second structural shape of the reflective surface 220*a* may have a generally non-planar configuration, or vice-a-versa.

An elastically deformable position adjustment member 221 is mounted between the optical member 220 and a substrate 230. In the illustrated embodiment, optical member 220 is transparent in order to permit the viewing of elastically deformable position adjustment member 221. The optical member 220 is mounted on the substrate 230 via the elastically deformable position adjustment member 221. The substrate 230 may be composed of a transparent material in order to facilitate the passing of UV light therethrough.

In accordance with one or more embodiments, the elastically deformable position adjustment member 221 is operable to adjust a mounting orientation of the optical member 220. The elastically deformable position adjustment member 221 may be arranged so as to be mounted (directly or indirectly) on the surface of the optical member 220. In the illustrated example embodiment, the elastically deformable position adjustment member 221 is mounted on the bottom surface of the optical member 220. Such bottom surface is opposite to the reflective surface 220*a* of the optical member 220. Embodiments, however, are not limited thereto, and thus, this disclosure contemplates the elastically deformable position adjustment member 221 being mounted on any suitable surface of the optical member 220 that falls within the spirit and scope of the principles of this disclosure.

In accordance with one or more embodiments, the elastically deformable position adjustment member 221 is composed of an elastically deformable base or substrate material, such as, for example, a polymer. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the elastically deformable position adjustment member 221 being composed of any suitable material that falls within the spirit and scope of the principles of this disclosure.

Figure 2C:
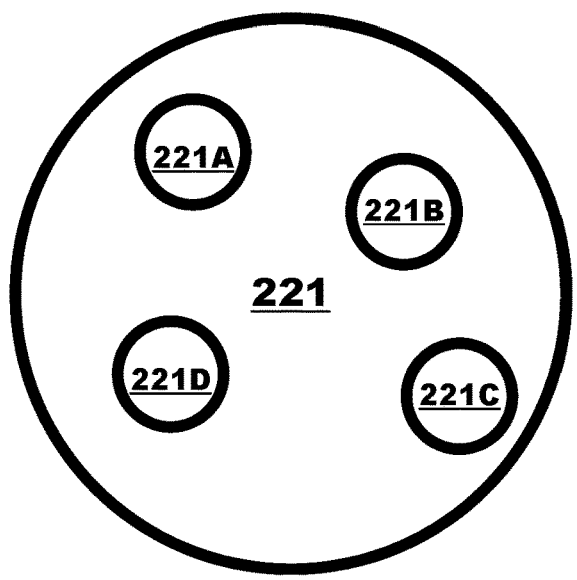

As illustrated in FIG. 2C, the elastically deformable base material of the elastically deformable position adjustment member 221 may include one or more photochromatic regions 221A, 221B, 221C, and 221D that are moveable from a contracted state to an expanded state in response to exposure to ultraviolet (UV) light. The one or more photochromatic regions 221A, 221B, 221C, and 221D may be integrated or otherwise embedded into the elastically deformable base material of the elastically deformable position adjustment member 221. The one or more photochromatic regions 221A, 221B, 221C, and 221D may be integrated or otherwise embedded so as to be partially or fully exposed from the surface of the elastically deformable position adjustment member 221. The one or more photochromatic regions 221A, 221B, 221C, and 221D are composed of an organic photochromatic material, such as, for example, spiropyran. Embodiments, however, are not limited thereto, and thus, this disclosure contemplates the photochromatic regions 221A, 221B, 221C, and 221D being composed of any suitable photochromatic material or composite materials that falls within the spirit and scope of the principles of this disclosure. For example, during production of elastically deformable position adjustment member 221, the photochromatic material may be mixed into the elastically deformable base material.

The light apparatus 200 further comprises one or more light sources 210 operable to selectively emit illuminating UV light in a direction that selectively contacts the one or more photochromatic regions 221A, 221B, 221C, and 221D of the elastically deformable position adjustment member 221 in a manner that causes adjustment in the mounting orientation (i.e., spatial orientation) of the optical member 220. This adjustment thereby causes a change of direction of light reflected by the optical member 220. In particular, the optical member 220 is caused to move relative to the substrate 230 about an axis defined by the elastically deformable position adjustment member 221 in a manner that changes the direction of light reflected by the reflective surface 220*a* of the optical member 220. One or more baffles may be provided in order to isolate light from the one or more light sources 210.

In accordance with one or more embodiments, the one or more light sources 210 comprises LEDs. The one or more light sources 210 are controlled by the ADB controller and/or the control module/ECU 110. The ADB controller 151*a* and/or the control module/ECU 110 may be operable to control one or more of the position of the one or more light sources 210 and the intensity of the UV light emitted by the one or more light sources 210.

For example, the position of the one or more light sources 210 may be selectively adjusted in order to emit UV light in a direction that contacts only photochromatic regions 221A and 221B but not photochromatic regions 221C or 221D. This adjustment may be necessary in order to direct the light reflected by the optical member 220 in a specific direction.

In accordance with one or more embodiments, the ADB controller 151*a* and/or the control module/ECU 110 may include one or more processors and a non-transitory memory operatively coupled to the one or more processors comprising a set of instructions executable by the one or more processors to cause the one or more processors to dynamically conduct an analysis of sensor data transmitted by the sensor system 140. In response to the analysis of the sensor data, the ADB controller 151*a* and/or the control module/ECU 110 may then dynamically adjust a direction of emission of light by the light apparatus 200 by adjusting the mounting orientation of the optical member 220 through a selective actuation of the one or more light sources 210.

In accordance with one or more embodiments, the adjustment in the direction of emission of light by the light apparatus 200 may be in response to sensor data relating to an operational environment of a vehicle 100. Alternatively or additionally, the adjustment in the direction of emission of light by the light apparatus 200 may be in response to sensor data relating to an external operational environment of a vehicle 100. For example, the sensor data may comprise vehicle steering sensor data during operation of the vehicle 100. Alternatively or additionally, the sensor data may comprise vehicle speed sensor data during operation of the vehicle 100.

In accordance with one or more embodiments, the amount of adjustment in the mounting orientation of the optical member 220 corresponds to amount or intensity of light emitted by the one or more light sources 210. Accordingly, in response to the analysis of the sensor data, the ADB controller 151a and/or the control module/ECU 110 may be operable to dynamically adjust the direction of light reflected by the optical member 220 by selectively adjusting an intensity of the UV light emitted by the one or more light sources 210. The greater the intensity of the UV light may thus yield greater adjustments in the mounting orientation of the optical member 220.

Figure 3A:
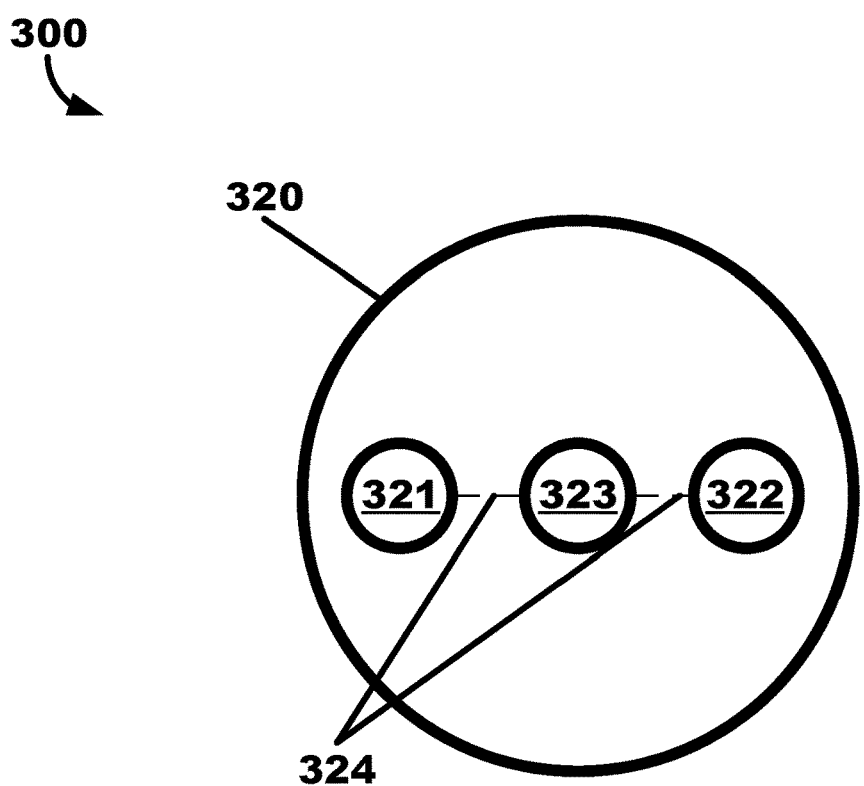
FIGS. 3A through 3C illustrate an example light apparatus, in accordance with one or more embodiments set forth, shown, and described herein.
Figure 3B:
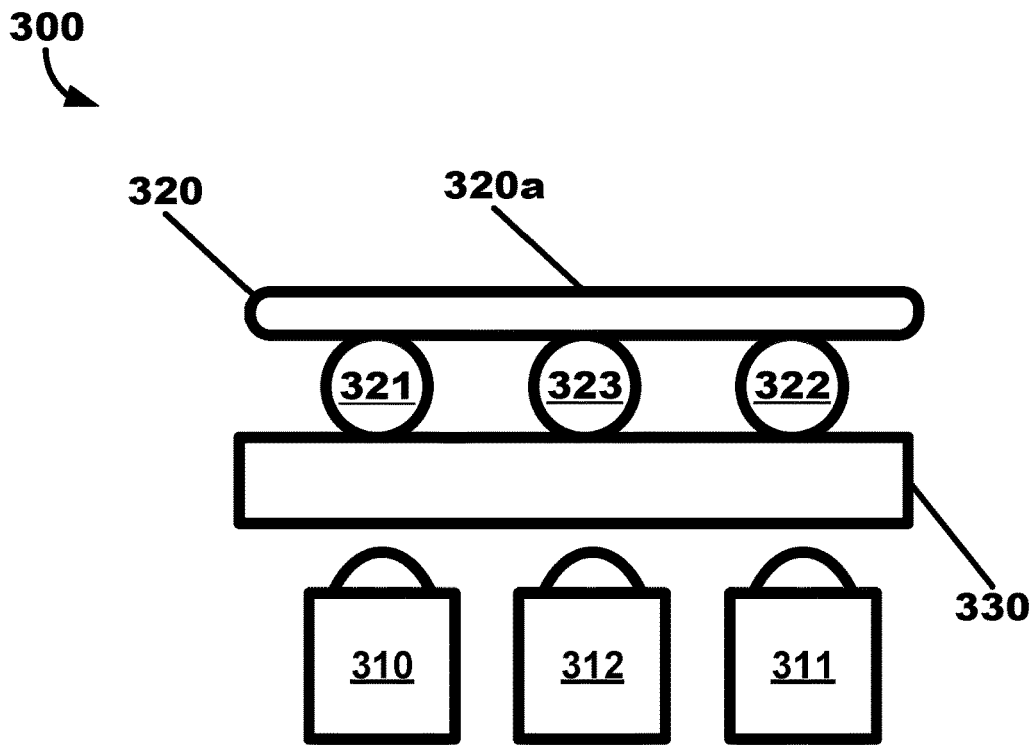
Figure 3C:
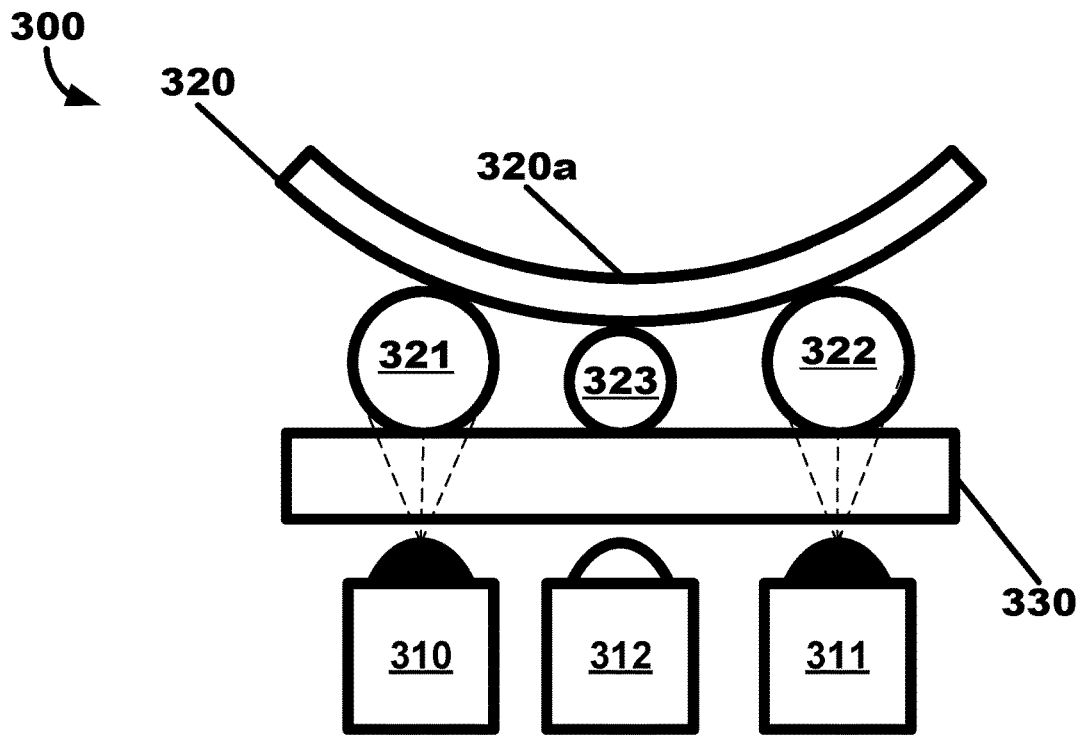

As illustrated in FIGS. 3A through 3C, an example light apparatus 300 is provided in accordance with one or more embodiments. The light apparatus 300 comprises an optical member 320 composed of an elastically deformable material. The elastically deformable material may comprise a shape memory material. The optical member 320 comprises, for example, a mirror having a reflective surface 320a operable to reflect light. For example, the light reflected by the optical mirror 320 may be reflected in a direction to contact another optical member such as, for example, a projection lens (not illustrated). Because of its elastically deformable material composition, the optical member 320 is operable for movement between a first state in which the reflective surface has a first structural shape, and a plurality of second states in which the reflective surface 220a has a second structural shape different than the first structural shape.

In accordance with one or more embodiments, the first structural shape of the reflective surface 320a may have a generally planar configuration (FIG. 3B) whereas the second structural shape of the reflective surface 320a may have a generally non-planar configuration (FIG. 3C), or vice-a-versa.

The light apparatus 300 further comprises a plurality of elastically deformable position adjustment members that include a first elastically deformable position adjustment member 321, a second elastically deformable position adjustment member 322, and a third elastically deformable position adjustment member 323 that are respectively mounted spaced apart from each other between the optical member 320 and a substrate 330. The substrate 330 may be composed of a transparent material in order to facilitate the passing of UV light therethrough. Although the illustrated example embodiment shows three elastically deformable position adjustment members 321, 322, 323, embodiments are not limited thereto. This disclosure contemplates the overall number of elastically deformable position adjustment members may include more or less elastically deformable position adjustment members with respective light sources according to the spirit of the invention.

Alternatively or additionally, the elastically deformable position adjustment members 321, 322, 323 may be interconnected to each other via one or more links 324 to form a unitary elastically deformable position adjustment apparatus. Alternatively or additionally, the elastically deformable position adjustment members 321, 322, 323 may be interconnected to each other via direct contact at respective contact interfaces to form a unitary elastically deformable position adjustment apparatus.

The optical member 320 is mounted on the substrate 330 via the first elastically deformable position adjustment member 321, the second elastically deformable position adjustment member 322, and the third elastically deformable position adjustment member 323. Although the illustrated example embodiment shows symmetric arrangement of the first elastically deformable position adjustment member 321, the second elastically deformable position adjustment member 322, and the third elastically deformable position adjustment member 323 on the substrate 330, embodiments are not limited thereto. This disclosure contemplates the first elastically deformable position adjustment member 321, the second elastically deformable position adjustment member 322, and the third elastically deformable position adjustment member 323 being mounted asymmetrically in a manner that falls within the spirit and scope of the principles of this disclosure.

In accordance with one or more embodiments, the first elastically deformable position adjustment member 321, the second elastically deformable position adjustment member 322, and the third elastically deformable position adjustment member 323 are operable to adjust a mounting orientation of the optical member 320. The first elastically deformable position adjustment member 321, the second elastically deformable position adjustment member 322, and the third elastically deformable position adjustment member 323 may be arranged so as to be mounted (directly or indirectly) on the surface of the optical member 320. In the illustrated example embodiment, the first elastically deformable position adjustment member 321, the second elastically deformable position adjustment member 322, and the third elastically deformable position adjustment member 323 are mounted on the bottom surface of the optical member 320. Such bottom surface is opposite to the reflective surface 320a of the optical member 320. Embodiments, however, are not limited thereto, and thus, this disclosure contemplates the first elastically deformable position adjustment member 321, the second elastically deformable position adjustment member 322, and the third elastically deformable position adjustment member 323 being mounted on any suitable surface of the optical member 320 that falls within the spirit and scope of the principles of this disclosure.

In accordance with one or more embodiments, the first elastically deformable position adjustment member 321, the second elastically deformable position adjustment member 322, and the third elastically deformable position adjustment member 323 are composed of an elastically deformable base or substrate material, such as, for example, a polymer. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the first elastically deformable position adjustment member 321, the second elastically deformable position adjustment member 322, and the third elastically deformable position adjustment member 323 being composed of any suitable material that falls within the spirit and scope of the principles of this disclosure.

Analogously to the example embodiment of FIG. 2C, the elastically deformable base material of the first elastically deformable position adjustment member 321, the second elastically deformable position adjustment member 322, and the third elastically deformable position adjustment member 323 may include one or more photochromatic regions that are moveable from a contracted state to an expanded state in response to exposure to ultraviolet (UV) light. The one or more photochromatic regions may be integrated or otherwise embedded into the elastically deformable base material of the first elastically deformable position adjustment member 321, the second elastically deformable position adjustment member 322, and the third elastically deformable position adjustment member 323. The one or more photochromatic regions are composed of an organic photochromatic material, such as, for example, spiropyran. Embodiments, however, are not limited thereto, and thus, this disclosure contemplates the photochromatic regions being composed of any suitable photochromatic material or composite materials that falls within the spirit and scope of the principles of this disclosure. For example, during production of the first elastically deformable position adjustment member 321, the second elastically deformable position adjustment member 322, and the third elastically deformable position adjustment member 323, the photochromatic material may be mixed into the elastically deformable base material.

The light apparatus 300 further comprises one or more light sources that include a first light source 310 (corresponding to the first elastically deformable position adjustment member 321), a second light source 311 (corresponding to the second elastically deformable position adjustment member 322), and a third light source 312 (corresponding to the third elastically deformable position adjustment member 323) respectively operable to selectively emit illuminating UV light in a direction that selectively contacts the one or more photochromatic regions of the first elastically deformable position adjustment member 321, the second elastically deformable position adjustment member 322, and the third elastically deformable position adjustment member 323 in a manner that causes adjustment in the mounting orientation (i.e., spatial orientation) of the optical member 320. This adjustment thereby causes a change of direction of light reflected by the optical member 320. In particular, as illustrated in FIG. 3B, selective regions of the optical member 320 may be caused to move or bend (e.g., in an upward direction) relative to the substrate 330 about an axis defined by one or more of the first elastically deformable position adjustment member 321, the second elastically deformable position adjustment member 322, and the third elastically deformable position adjustment member 323 in a manner that changes the direction of light reflected by the optical member 320. One or more baffles may be provided in order to isolate light from the light sources 310, 311, 312.

In the illustrated example embodiment of FIG. 3C, the first light source 310 and the second light source 311 are selectively activated to emit UV light, thereby causing expansion of the spiropyran material of the first elastically deformable position adjustment member 321 and the second elastically deformable position adjustment member 322. Because the third light source 312 is not activated, the spiropyran material of the third elastically deformable position adjustment member 323 is maintained in an unexpanded state. This causes the optical member 320 to move from a first operating state in which it has a relatively planar reflection surface to a second operating state in which it has a relatively concave reflection surface 320a (FIG. 3C).

Alternatively, the third light source 312 may be selectively activated to emit UV light while the first light source 310 and the second light source 311 are not activated, thereby causing expansion of the spiropyran material of the third elastically deformable position adjustment member 323. This causes the optical member 320 to move from a first operating state in which it has a relatively planar reflection surface 320a (FIG. 3B) to a second operating state in which it has a relatively convex reflection surface.

In accordance with one or more embodiments, the first light source 310, the second light source 311, and the third light source 312 comprises LEDs. The first light source 310, the second light source 311, and the third light source 312 are controlled by the ADB controller 151a and/or the control module/ECU 110. The ADB controller 151a and/or the control module/ECU 110 may be operable to control one or more of the orientation of the first light source 310, the second light source 311, and the third light source 312 and the intensity of the UV light emitted by the first light source 310, the second light source 311, and the third light source 312.

For example, the position of the first light source 310, the second light source 311, and the third light source 312 may be selectively adjusted in order to emit UV light in a direction that contacts only certain photochromatic regions but not other photochromatic regions. This adjustment may be necessary in order to direct the light reflected by the optical member 320 in a specific direction.

In accordance with one or more embodiments, the ADB controller 151a and/or the control module/ECU 110 may include one or more processors and a non-transitory memory operatively coupled to the one or more processors comprising a set of instructions executable by the one or more processors to cause the one or more processors to dynamically conduct an analysis of sensor data transmitted by the sensor system 140. In response to the analysis of the sensor data, the ADB controller 151a and/or the control module/ECU 110 may then dynamically adjust a direction of emission of light by the light apparatus 300 by adjusting the mounting orientation of the optical member 320 through a selective actuation of the first light source 310, the second light source 311, and the third light source 312.

In accordance with one or more embodiments, the adjustment in the direction of emission of light by the light apparatus 300 may be in response to sensor data relating to an operational environment of a vehicle 100. Alternatively or additionally, the adjustment in the direction of emission of light by the light apparatus 300 may be in response to sensor data relating to an external operational environment of a vehicle 100. For example, the sensor data may comprise vehicle steering sensor data during operation of the vehicle 100. Alternatively or additionally, the sensor data may comprise vehicle speed sensor data during operation of the vehicle 100.

In accordance with one or more embodiments, the adjustment of the mounting orientation of the optical member 320 corresponds to amount or intensity of light emitted by the first light source 310, the second light source 311, and the third light source 312. Accordingly, in response to the analysis of the sensor data, the ADB controller 151a and/or the control module/ECU 110 may be operable to dynamically adjust the direction of light reflected by the optical member 320 by selectively adjusting an intensity of the UV light emitted by the first light source 310, the second light source 311, and the third light source 312. The greater the intensity of the UV light may thus yield greater adjustments in the mounting orientation of the optical member 320.

Figure 4A:
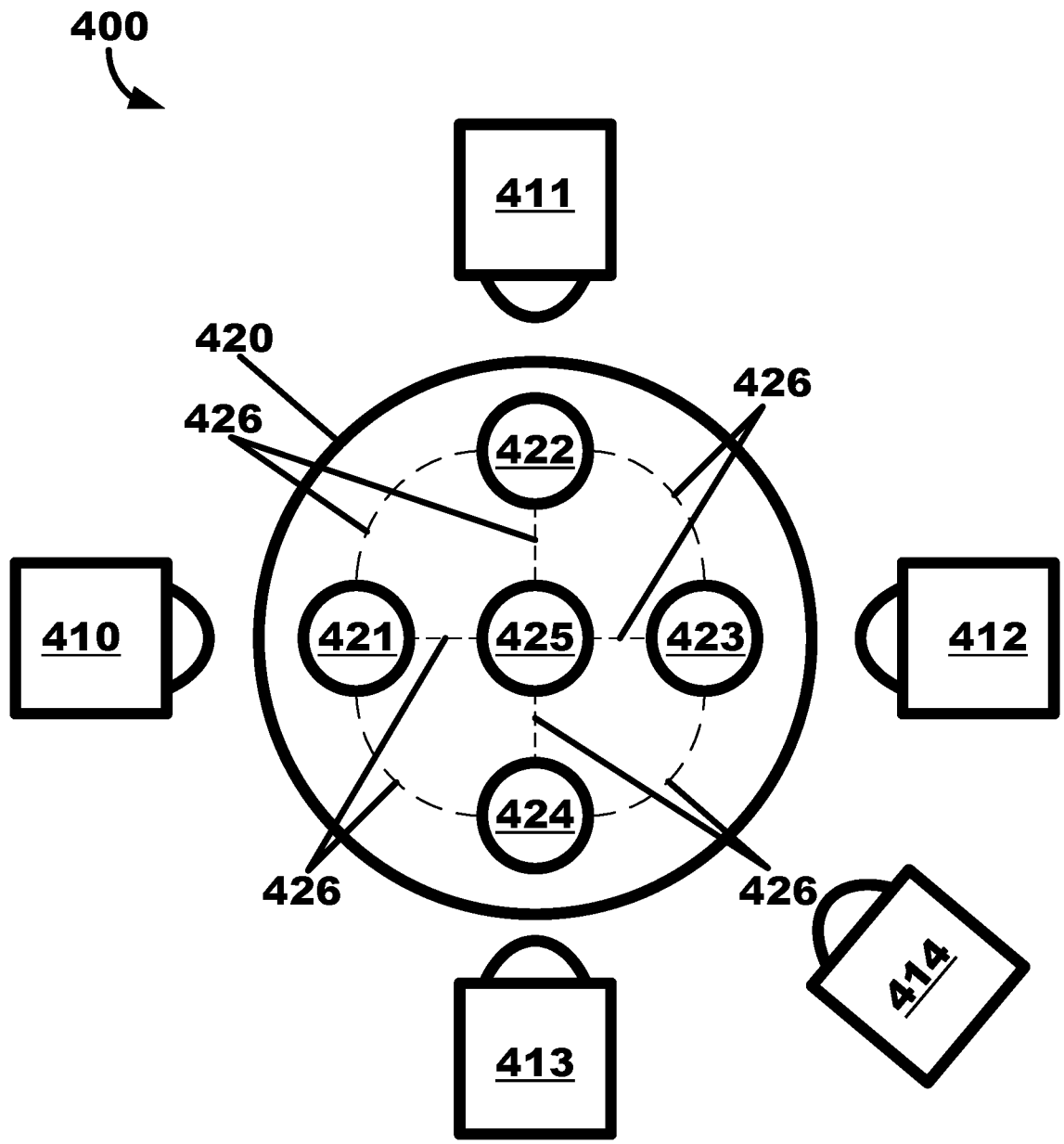
FIGS. 4 through 4C illustrate an example light apparatus, in accordance with one or more embodiments set forth, shown, and described herein.
Figure 4B:
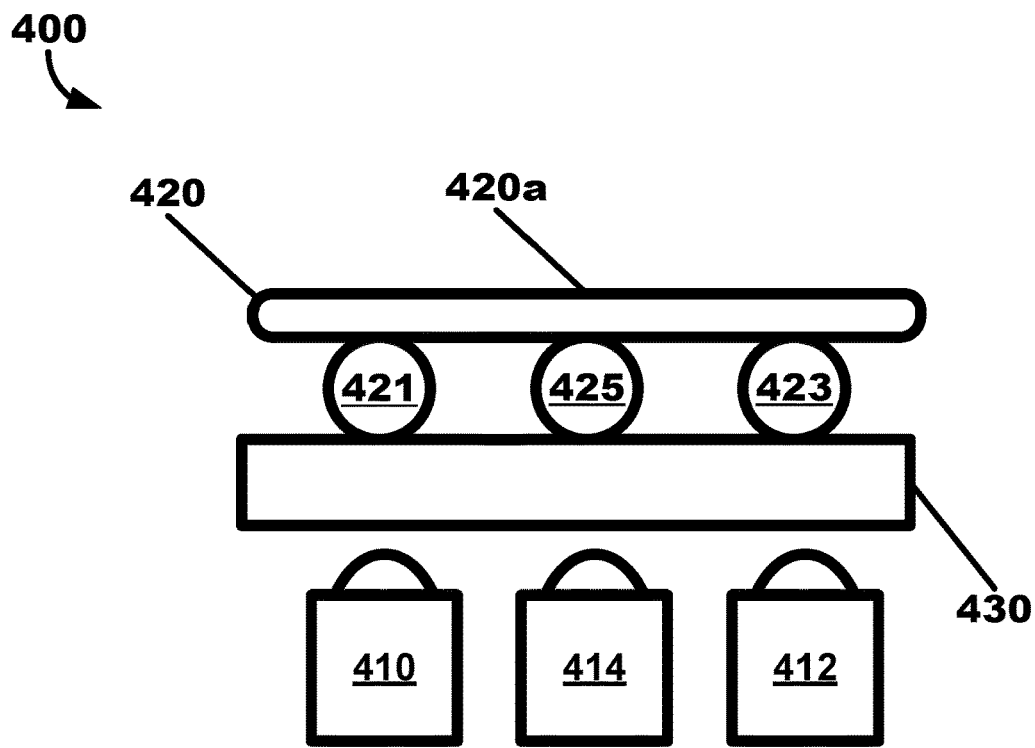
Figure 4C:
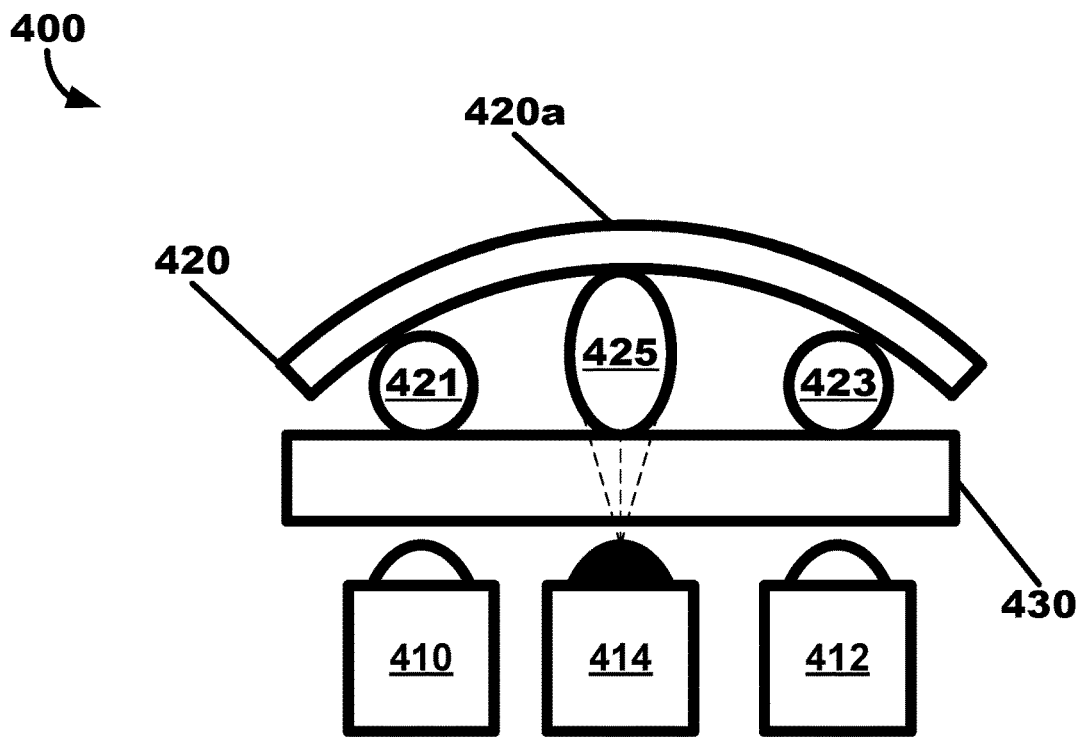

As illustrated in FIGS. 4A through 4C, an example light apparatus 400 is provided in accordance with one or more embodiments. The light apparatus 400 comprises an optical member 420 composed of an elastically deformable material. The elastically deformable material may comprise a shape memory material. The optical member 420 comprises, for example, a mirror having a reflective surface 420a operable to reflect light. For example, the light reflected by the optical mirror 420 may be reflected in a direction to contact another optical member such as, for example, a projection lens. Because of its elastically deformable material composition, the optical member 420 is operable for movement between a first state in which the reflective surface has a first structural shape, and a plurality of second states in which the reflective surface 420a has a second structural shape different than the first structural shape.

In accordance with one or more embodiments, the first structural shape of the reflective surface 420a may have a generally planar configuration (FIG. 4B) whereas the second structural shape of the reflective surface 420a may have a generally non-planar configuration (FIG. 4C), or vice-a-versa.

The light apparatus 400 further comprises a plurality of elastically deformable position adjustment members including a first elastically deformable position adjustment member 421, a second elastically deformable position adjustment member 422 (not illustrated in FIGS. 4B and 4C), a third elastically deformable position adjustment member 423, a fourth elastically deformable position adjustment member 424 (not illustrated in FIGS. 4B and 4C), and a fifth elastically deformable position adjustment member 425 that are respectively mounted spaced apart from each other between the optical member 420 and a substrate 430. In the illustrated embodiment, the optical member 420 is transparent in order to permit the viewing of elastically deformable position adjustment members 421, 422, 423, 424, and 425. The substrate 430 may be composed of a transparent material in order to facilitate the passing of UV light therethrough.

Alternatively or additionally, the elastically deformable position adjustment members 421, 422, 423, 424, and 425 may be interconnected to each other via links 426 to form a unitary elastically deformable position adjustment apparatus. Alternatively or additionally, the elastically deformable position adjustment members 421, 422, 423, 424, and 425 may be interconnected to each other via direct contact at respective contact interfaces to form a unitary elastically deformable position adjustment apparatus.

The optical member 420 is mounted on the substrate 430 via the elastically deformable position adjustment members 421, 422, 423, 424, and 425. Although the illustrated example embodiment shows symmetric arrangement of the elastically deformable position adjustment members 421, 422, 423, 424, and 425, embodiments are not limited thereto. This disclosure contemplates mounting the elastically deformable position adjustment members 421, 422, 423, 424, 425 asymmetrically in a manner that falls within the spirit and scope of the principles of this disclosure.

In accordance with one or more embodiments, the elastically deformable position adjustment members 421, 422, 423, 424, and 425 are operable to adjust a mounting orientation of the optical member 420. The elastically deformable position adjustment members 421, 422, 423, 424, and 425 may be arranged so as to be mounted (directly or indirectly) in a manner that engages the surface of the optical member 420. In the illustrated example embodiment, the first elastically deformable position adjustment member 421, the second elastically deformable position adjustment member 422, the third elastically deformable position adjustment member 423, the fourth elastically deformable position adjustment member 424, and the fifth elastically deformable position adjustment member 425 are mounted to engage the bottom surface of the optical member 420. Such bottom surface is opposite to the reflective surface of the optical member 420. Embodiments, however, are not limited thereto, and thus, this disclosure contemplates the elastically deformable position adjustment members 421, 422, 423, 424, and 425 being mounted so as to engage any suitable surface of the optical member 420 that falls within the spirit and scope of the principles of this disclosure.

In accordance with one or more embodiments, the elastically deformable position adjustment members 421, 422, 423, 424, and 425 are composed of an elastically deformable base or substrate material, such as, for example, a polymer. Such a polymer may include, but is not limited to, poly (methyl acrylate) (PMA), poly (methyl methacrylate) (PMMA), low-density polyethylene, and the like. Embodiments, however, are not limited thereto, and thus, this disclosure contemplates the elastically deformable position adjustment members 421, 422, 423, 424, and 425 being composed of any suitable material that falls within the spirit and scope of the principles of this disclosure.

Analogously to the example embodiment of FIG. 2C, the elastically deformable base material of the elastically deformable position adjustment members 421, 422, 423, 424, and 425 may include one or more photochromatic regions that are moveable from a contracted state to an expanded state in response to exposure to ultraviolet (UV) light. The one or more photochromatic regions may be integrated or otherwise embedded into the elastically deformable base material of the elastically deformable position adjustment members 421, 422, 423, 424, and 425. The one or more photochromatic regions are composed of an organic photochromatic material, such as, for example, spiropyran. Embodiments, however, are not limited thereto, and thus, this disclosure contemplates the photochromatic regions being composed of any suitable photochromatic material or composite materials that falls within the spirit and scope of the principles of this disclosure. For example, during production of the elastically deformable position adjustment members 421, 422, 423, 424, and 425, the photochromatic material may be mixed into the elastically deformable base material.

The light apparatus 400 further comprises one or more light sources that include a first light source 410 (corresponding to the first elastically deformable position adjustment member 421), a second light source 411 (corresponding to the second elastically deformable position adjustment member 422), a third light source 412 (corresponding to the third elastically deformable position adjustment member 423), a fourth light source 413 (corresponding to the fourth elastically deformable position adjustment member 424) and a fifth light source 414 (corresponding to the fifth elastically deformable position adjustment member 425) respectively operable to selectively emit illuminating UV light in a direction that selectively contacts the one or more photochromatic regions of the elastically deformable position adjustment members 421, 422, 423, 424, and 425 in a manner that causes adjustment in the mounting orientation (i.e., spatial orientation) of the optical member 420. This adjustment thereby causes a change of direction of light reflected by the optical member 420. In particular, the optical member 420 may be caused to pivot relative to the substrate 430 about an axis defined by one or more of the elastically deformable position adjustment members 421, 422, 423, 424, and 425 in a manner that changes the direction of light reflected by the optical member 420. One or more baffles may be provided in order to isolate light from the one or more light sources 410, 411, 412, 413, and 414.

In accordance with one or more embodiments, the first light source 410, the second light source 411, the third light source 412, the fourth light source 413, and the fifth light source 414 comprises LEDs. The light sources 410, 411, 412, 413, and 414 are controlled by the ADB controller 151a and/or the control module/ECU 110. The ADB controller 151a and/or the control module/ECU 110 may be operable to control one or more of the position of the light sources 410, 411, 412, 413, and 414 and the intensity of the UV light emitted by the light sources 410, 411, 412, 413, and 414.

For example, the orientation of the light sources 410, 411, 412, 413, and 414 may be selectively adjusted in order to emit UV light in a direction that contacts only certain photochromatic regions but not other photochromatic regions. This adjustment may be necessary in order to direct the light reflected by the optical member 420 in a specific direction.

In accordance with one or more embodiments, the ADB controller 151a and/or the control module/ECU 110 may include one or more processors and a non-transitory memory operatively coupled to the one or more processors comprising a set of instructions executable by the one or more processors to cause the one or more processors to dynamically conduct an analysis of sensor data transmitted by the sensor system 140. In response to the analysis of the sensor data, the ADB controller 151a and/or the control module/ECU 110 may then dynamically adjust a direction of emission of light by the light apparatus 400 by adjusting the mounting orientation of the optical member 420 through a selective actuation of the light sources 410, 411, 412, 413, and 414.

In the illustrated example embodiment of FIG. 4C, the fifth light source 414 is selectively activated to emit UV light in a direction to contact the corresponding fifth elastically deformable position adjustment member 425, thereby causing expansion of the spiropyran material of the fifth elastically deformable position adjustment member 425. Because the first light source 410, the second light source 411, the third light source 412, and the fourth light source 413 are not activated, the spiropyran material of the corresponding elastically deformable position adjustment members 421, 422, 423, 424, and 425 are maintained in an unexpanded state. This causes the optical member 420 to move from a first operating state in which it has a relatively planar reflection surface 420a (FIG. 4B) to a second operating state in which it has a relatively convex reflection surface 420a (FIG. 4C).

In accordance with one or more embodiments, the adjustment in the direction of emission of light by the light apparatus 400 may be in response to sensor data relating to an operational environment of a vehicle 100. Alternatively or additionally, the adjustment in the direction of emission of light by the light apparatus 400 may be in response to sensor data relating to an external operational environment of a vehicle 100. For example, the sensor data may comprise vehicle steering sensor data during operation of the vehicle 100. Alternatively or additionally, the sensor data may comprise vehicle speed sensor data during operation of the vehicle 100.

In accordance with one or more embodiments, the adjustment of the mounting orientation of the optical member 420 corresponds to amount or intensity of light emitted by the light sources 410, 411, 412, 413, and 414. Accordingly, in response to the analysis of the sensor data, the ADB controller 151a and/or the control module/ECU 110 may be operable to dynamically adjust the direction of light reflected by the optical member 420 by selectively adjusting an intensity of the UV light emitted by the light sources 410, 411, 412, 413, and 414. The greater the intensity of the UV light may thus yield greater adjustments in the mounting orientation of the optical member 420.

Figure 5:
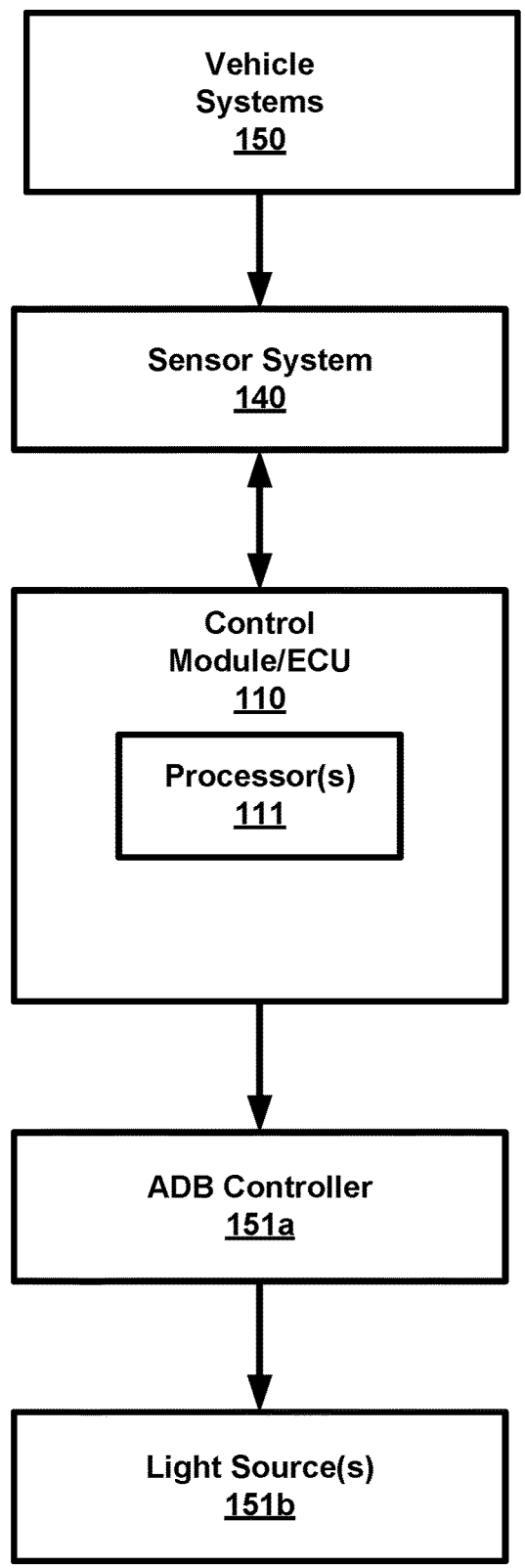
FIG. 5 illustrates an example lighting system, in accordance with one or more embodiments set forth, shown, and described herein.
Figure 6:
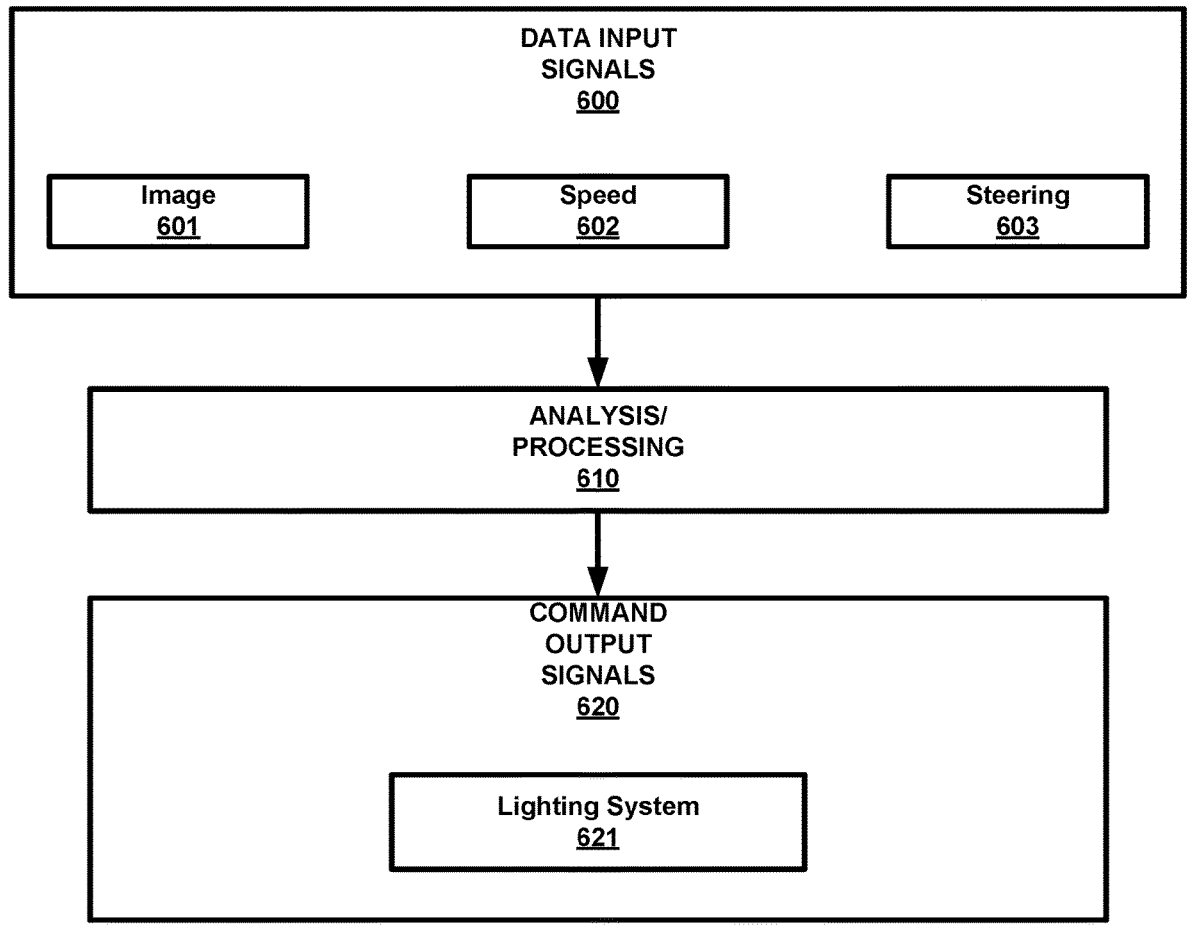
FIG. 6 illustrates a block diagram of control blocks for implementation in an example lighting system, in accordance with one or more embodiments set forth, shown, and described herein.

As illustrated in FIGS. 5 and 6, in accordance with one or more embodiments, the sensor system 140 is operable, at least during operation of the vehicle 100, to dynamically detect information about the vehicle systems 150 and a driving environment external to the vehicle 100, and then transmit, as sensor data, data input signals (e.g., image data 601, speed data 602, and steering data 603) to the control module/ECU 110 of the detected information. The one or more processors 111 of the control module/ECU 110, in response to the sensor data, are then operable to dynamically conduct an analysis 610 of the sensor data. In response to the analysis 610 of the sensor data, the one or more processors 111 are to then send one or more command output signals 620, 621 to the ADB controller 151a to cause the ADB controller 151a to dynamically adjust a direction of emission of light by the light apparatus by causing movement of the optical member 220, 320, 420 through a selective actuation of the one or more light sources 210, 310, 311, 312, 410, 411, 412, 413, and 414.

Alternatively or additionally, analysis 610 and command output signals 620, 621 may be executed by the ADB controller 151a. In such an example embodiment, the sensor system 140 is operable to transmit, as sensor data, data input signals (e.g., image data 601, speed data 602, and steering data 603) to the ADB controller 151a of the detected information. The one or more processors of the ADB controller 151a, in response to the sensor data, are then operable to dynamically conduct an analysis 610 of the sensor data. In response to the analysis 610 of the sensor data, the one or more processors of the ADB controller 151a are to then selectively transmit one or more command output signals 620, 621 to one or more of the light sources 210, 310, 311, 312, 410, 411, 412, 413, and 414 to dynamically adjust a direction of emission of light by the light apparatus by causing movement of the optical member 220, 320, 420.

Illustrated examples shown in FIGS. 7 to 10 set forth computer implemented methods 700, 800, 900, and 1000. The computer implemented methods 700, 800, 900, and 1000 may be implemented, for example, in logic instructions (e.g., software), configurable logic, fixed-functionality hardware logic, etc., or any combination thereof. In accordance with one or more embodiments, execution of the computer implemented methods 700, 800, 900, and 1000 may be performed by one or more of the control module/ECU 110 and the ADB controller 151a.

Figure 7:
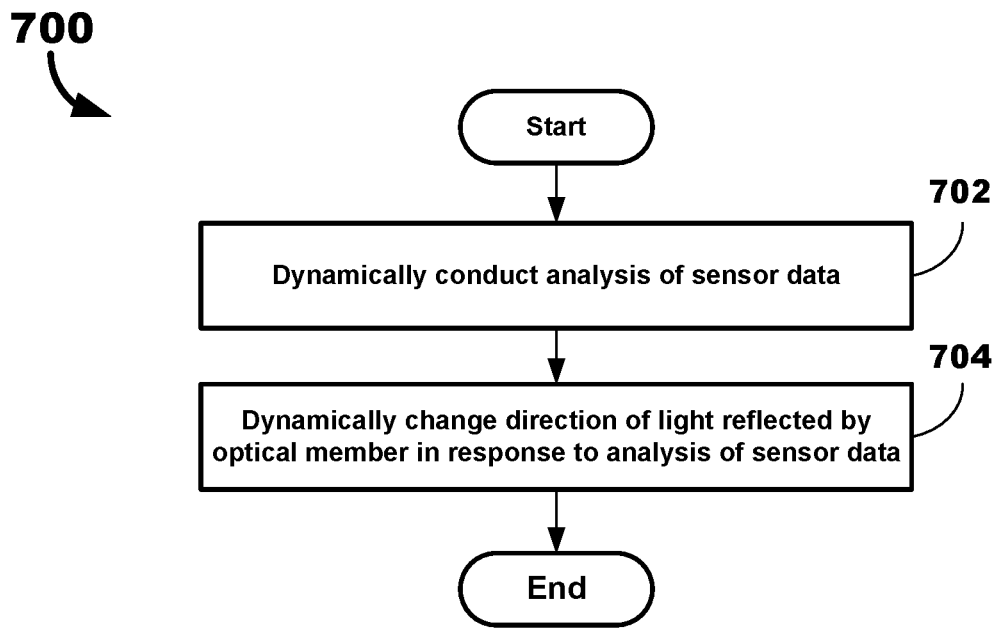
FIGS. 7 through 10 illustrate flowcharts of one or more example computer implemented methods, in accordance with one or more embodiments set forth, shown, and described herein.

In the computer implemented method 700 illustrated in FIG. 7, process block 702 includes dynamically conducting an analysis of sensor data.

In accordance with the computer implemented method 700, the sensor data relates to an operational environment of a vehicle. Alternatively or additionally, the sensor data relates to an external operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle. Alternatively or additionally, the sensor data relates to an operational environment of a lighting apparatus.

The computer implemented method 700 may then proceed to illustrated process block 704, which includes dynamically adjusting, in response to the analysis of the sensor data, a direction of light reflected by the optical member by causing movement of the optical member through a selective actuation of the one or more light sources.

In accordance with the computer implemented method 700, dynamically adjusting the direction of light reflected by the optical member comprises selectively adjusting an intensity of UV light emitted by the one or more light sources.

In accordance with the computer implemented method 700, dynamically adjusting the direction of light reflected by the optical member comprises selectively adjusting a position of the one or more light sources.

The method 700 may terminate or end after execution of process block 704.

Figure 8:
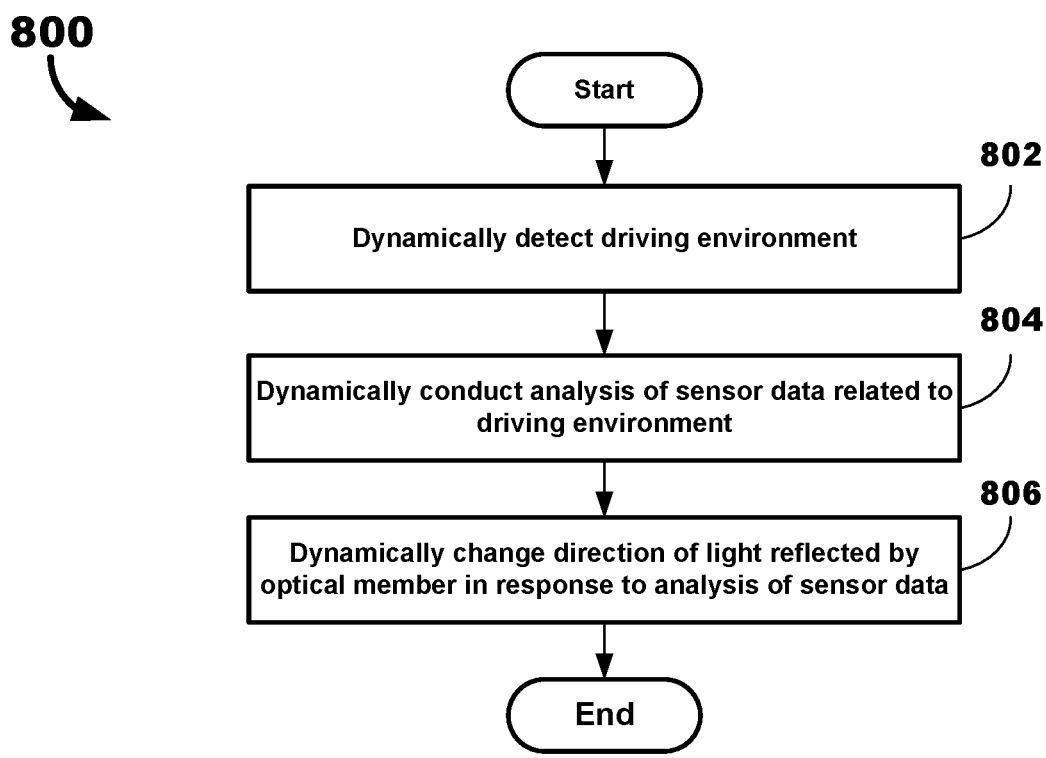

In the computer implemented method 800 illustrated in FIG. 8, illustrated process block 802 includes dynamically detecting, as sensor data, a driving environment of a vehicle.

In accordance with the computer implemented method 800, dynamically detecting the driving environment of a vehicle comprises dynamically detecting a driving environment located externally to the vehicle.

In accordance with the computer implemented method 800, at least a portion of an external driving environment of the vehicle may be dynamically sensed to detect objects on and/or adjacent to the roadway. Such objects may include, but is not limited to, other vehicles, pedestrians, animals, fallen trees, rocks, etc. in the external driving environment.

In accordance with the computer implemented method 800, the sensor data relates to an operational environment of a vehicle. Alternatively or additionally, the sensor data relates to an external operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

The computer implemented method 800 may then proceed to illustrated process block 804, which includes dynamically conducting an analysis of the sensor data.

The computer implemented method 800 may then proceed to illustrated process block 806, which includes dynamically adjusting, in response to the analysis of the sensor data, a direction of light reflected by the optical member by causing movement of the optical member through a selective actuation of the one or more light sources.

In accordance with the computer implemented method 800, dynamically adjusting the direction of light reflected by the optical member comprises selectively adjusting an intensity of UV light emitted by the one or more light sources.

In accordance with the computer implemented method 800, dynamically adjusting the direction of light reflected by the optical member comprises selectively adjusting a position of the one or more light sources.

The computer implemented method 800 may terminate or end after execution of process block 806.

Figure 9:
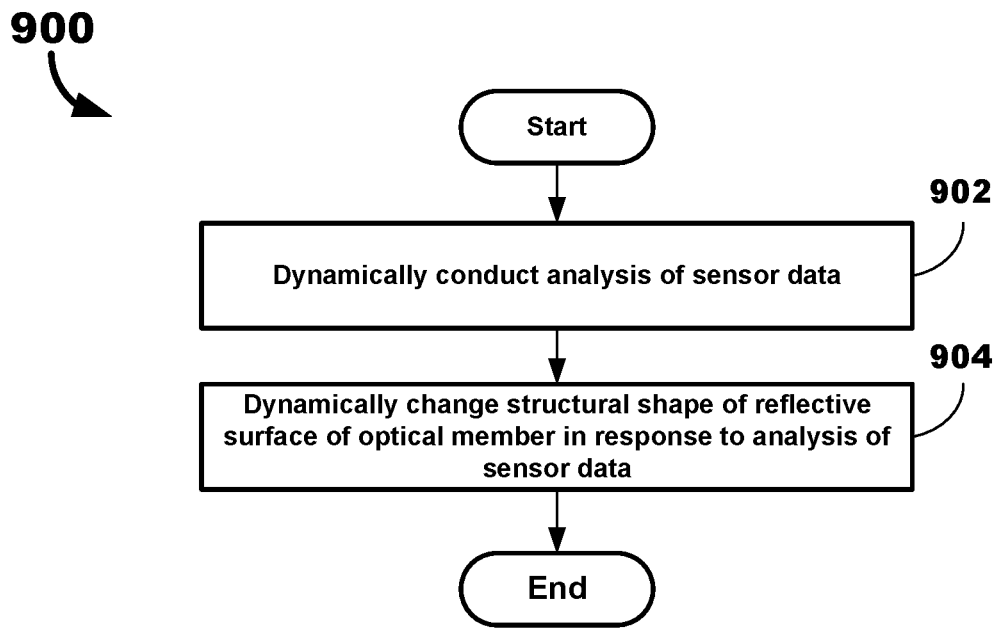

In the computer implemented method 900 illustrated in FIG. 9, process block 902 includes dynamically conducting an analysis of sensor data.

In accordance with the computer implemented method 900, the sensor data relates to an operational environment of a vehicle. Alternatively or additionally, the sensor data relates to an external operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle. Alternatively or additionally, the sensor data relates to an operational environment of a lighting apparatus.

The computer implemented method 900 may then proceed to illustrated process block 904, which includes dynamically changing, in response to the analysis of the sensor data, the structural shape of the reflective surface of an optical member of the light apparatus through a selective actuation of the one or more light sources.

In accordance with the computer implemented method 900, dynamically changing the structural shape of the reflective surface comprises selectively adjusting an intensity of UV light emitted by the one or more light sources.

In accordance with the computer implemented method 900, dynamically changing the structural shape of the reflective surface comprises selectively adjusting an orientation of the one or more light sources.

The method 900 may terminate or end after execution of process block 904.

Figure 10:
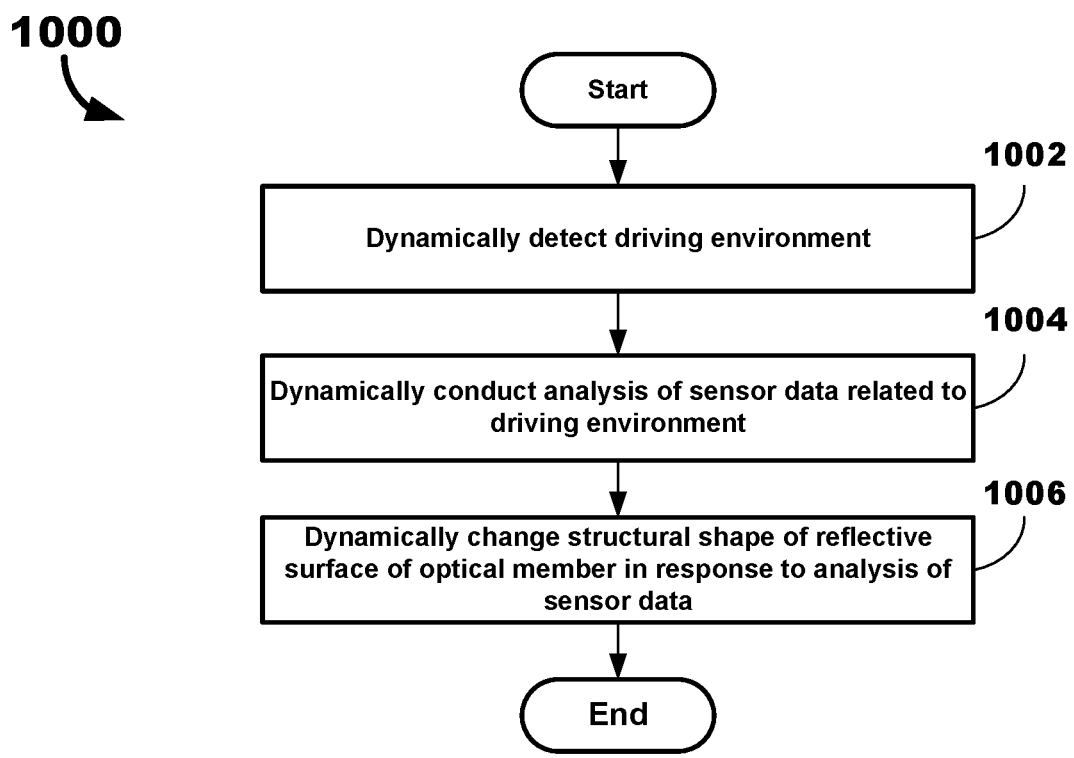

In the computer implemented method 1000 illustrated in FIG. 10, illustrated process block 1002 includes dynamically detecting, as sensor data, a driving environment of a vehicle.

In accordance with the computer implemented method 1000, dynamically detecting the driving environment of a vehicle comprises dynamically detecting a driving environment located externally to the vehicle.

In accordance with the computer implemented method 1000, at least a portion of an external driving environment of the vehicle may be dynamically sensed to detect objects on and/or adjacent to the roadway. Such objects may include, but is not limited to, other vehicles, pedestrians, animals, fallen trees, rocks, etc. in the external driving environment.

In accordance with the computer implemented method 1000, the sensor data relates to an operational environment of a vehicle. Alternatively or additionally, the sensor data relates to an external operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

The computer implemented method 1000 may then proceed to illustrated process block 1004, which includes dynamically conducting an analysis of the sensor data.

The computer implemented method 1000 may then proceed to illustrated process block 1006, which includes dynamically changing, in response to the analysis of the sensor data, the structural shape of the reflective surface of an optical member of the light apparatus through a selective actuation of the one or more light sources.

In accordance with the computer implemented method 1000, dynamically changing the structural shape of the reflective surface comprises selectively adjusting an intensity of UV light emitted by the one or more light sources.

In accordance with the computer implemented method 1000, dynamically changing the structural shape of the reflective surface comprises selectively adjusting an orientation of the one or more light sources.

The computer implemented method 1000 may terminate or end after execution of process block 1006.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A light apparatus, comprising:
an optical member, composed of an elastically deformable material, having a reflective surface to reflect light, the optical member being operable for movement between a first state in which the reflective surface has a first structural shape, and a plurality of second states in which the reflective surface has a second structural shape different than the first structural shape;
one or more elastically deformable position adjustment members operable to move the optical member between the first state and the plurality of second states, the one or more elastically deformable position adjustment members having one or more photochromatic regions that are moveable in response to exposure to ultraviolet (UV) light; and
one or more light sources operable to selectively emit illuminating UV light in a direction that contacts the one or more photochromatic regions to thereby adjust an orientation of the optical member in a manner which changes a direction of light reflected by the optical member.

2. The light apparatus of claim 1, wherein:
the one or more elastically deformable position adjustment members comprises a polymer substrate, and
the one or more photochromatic regions are composed of a photochromatic material that is embedded into the polymer substrate.

3. The light apparatus of claim 2, wherein the photochromatic material comprises an organic photochromatic material.

4. The light apparatus of claim 3, wherein the organic photochromatic material comprises spiropyran.

5. The light apparatus of claim 1, wherein the one or more light sources comprise LED light sources.

6. The light apparatus of claim 1, wherein the one or more elastically deformable position adjustment members are arranged spaced apart on a surface of the optical member that is opposite to the reflective surface.

7. The light apparatus of claim 1, wherein the one or more elastically deformable position adjustment members are interconnected to each other on a surface of the optical member.

8. A lighting system, comprising:
a light apparatus that includes an optical member, composed of an elastically deformable material, having a reflective surface to reflect light, the optical member being composed of an elastically deformable material operable for movement between a first state in which the reflective surface has a first structural shape, and a plurality of second states in which the reflective surface has a second structural shape different than the first structural shape, one or more elastically deformable position adjustment members operable to move the optical member between the first state and the plurality of second states, the one or more elastically deformable position adjustment members having one or more photochromatic regions that are moveable in response to exposure to ultraviolet (UV) light, and one or more light sources operable to selectively emit illuminating UV light in a direction that contacts the one or more photochromatic regions to thereby adjust an orientation of the optical member in a manner which changes a direction of light reflected by the optical member; and
a controller, operatively coupled to the one or more light sources, the controller including one or more processors and a non-transitory memory operatively coupled to the one or more processors comprising a set of instructions executable by the one or more processors to cause the one or more processors to:
dynamically conduct an analysis of sensor data; and
dynamically change, in response to the analysis of the sensor data, a direction of light reflected by the optical member by causing movement of the optical member through a selective actuation of the one or more light sources.

9. The lighting system of claim 8, wherein the sensor data relates to an operational environment of a vehicle.

10. The lighting system of claim 8, wherein the sensor data comprises image sensor data of an external operational environment of a vehicle.

11. The lighting system of claim 8, wherein the sensor data comprises vehicle steering sensor data during operation of the vehicle.

12. The lighting system of claim 8, wherein the sensor data comprises vehicle speed sensor data during operation of the vehicle.

13. The lighting system of claim 8, wherein the set of instructions cause the one or more processors to dynamically change the direction of light reflected by the optical member by selectively adjusting an intensity of the UV light emitted by the one or more light sources.

14. A computer implemented method of operating a light apparatus that includes an optical member, composed of an elastically deformable material, having a reflective surface to reflect light, the optical member being composed of an elastically deformable material operable for movement between a first state in which the reflective surface has a first structural shape, and a plurality of second states in which the reflective surface has a second structural shape different than the first structural shape, one or more elastically deformable position adjustment members operable to move the optical member between the first state and the plurality of second states, the one or more elastically deformable position adjustment members having one or more photochromatic regions that are moveable in response to exposure to ultraviolet (UV) light, and one or more light sources operable to selectively emit illuminating UV light in a direction that contacts the one or more photochromatic regions to thereby adjust an orientation of the optical member in a manner which changes a direction of light reflected by the optical member, the computer implemented method comprising:
dynamically conducting an analysis of sensor data; and
dynamically changing, in response to the analysis of the sensor data, a direction of light reflected by the optical member by causing movement of the optical member through a selective actuation of the one or more light sources.

15. The computer implemented method of claim 14, wherein the sensor data relates to an operational environment of a vehicle.

16. The computer implemented method of claim 14, wherein the sensor data comprises image sensor data of an external operational environment of a vehicle.

17. The computer implemented method of claim 14, wherein the sensor data comprises vehicle steering sensor data during operation of the vehicle.

18. The computer implemented method of claim 14, wherein the sensor data comprises vehicle speed sensor data during operation of the vehicle.

19. The computer implemented method of claim 14, wherein dynamically changing the direction of light reflected by the optical member comprises selectively adjusting an intensity of the UV light emitted by the one or more light sources.

20. The computer implemented method of claim 14, wherein dynamically adjusting the direction of light reflected by the optical member comprises selectively adjusting an orientation of the one or more light sources.

\* \* \* \* \*